Figure 5:
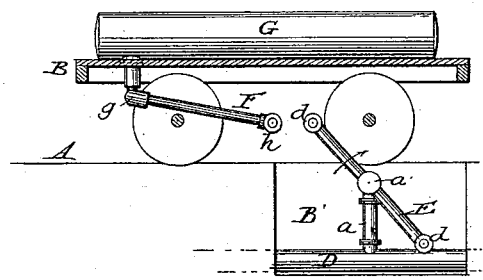

(No Model.) 9 Sheets—Sheet 1.
H. WIEDLING.
RAILWAY SYSTEM.
No. 338,681. Patented Mar. 23, 1886.
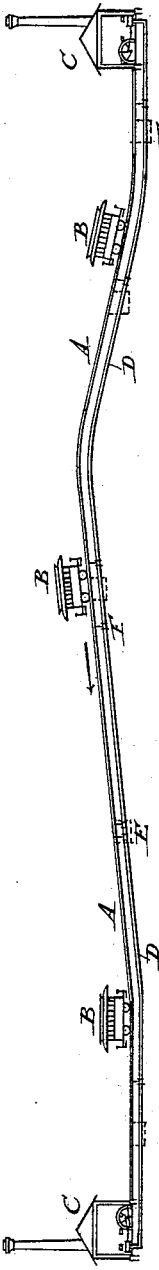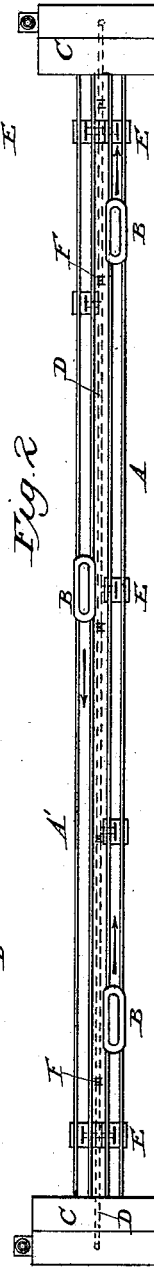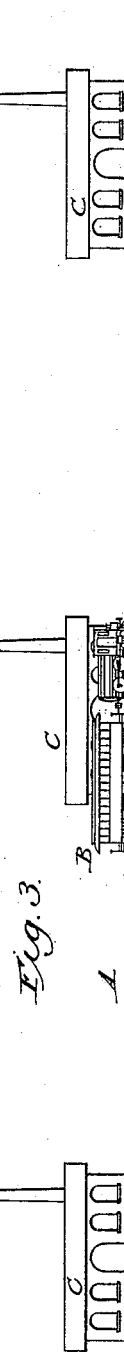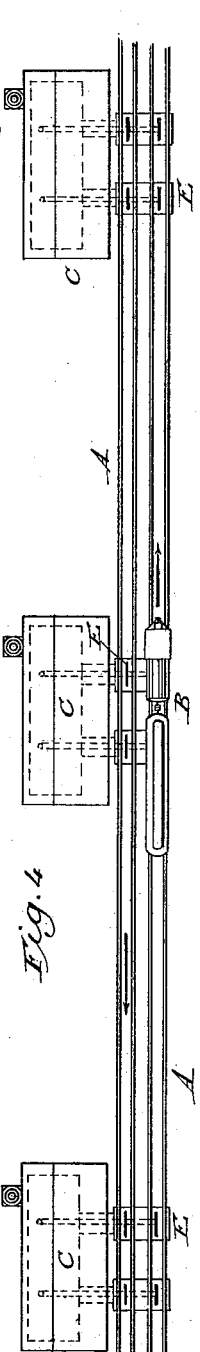

(No Model.) 9 Sheets—Sheet 2.
H. WIEDLING.
RAILWAY SYSTEM.

No. 338,681. Patented Mar. 23, 1886.

WITNESSES

INVENTOR
Hermann Wiedling.
By P. T. Dodge.
Attorney (No Model.) 9 Sheets—Sheet 3.
H. WIEDLING.
RAILWAY SYSTEM.
No. 338,681. Patented Mar. 23, 1886.
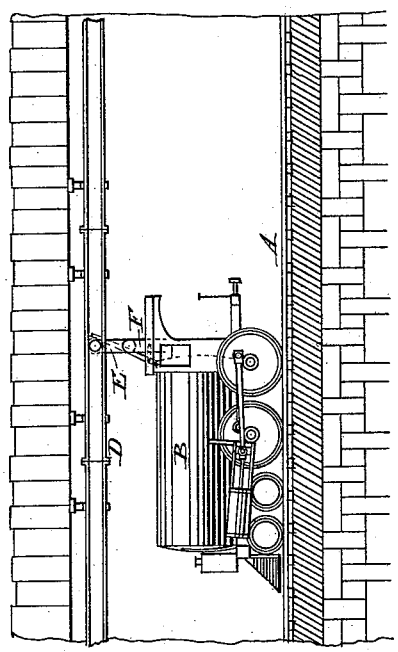
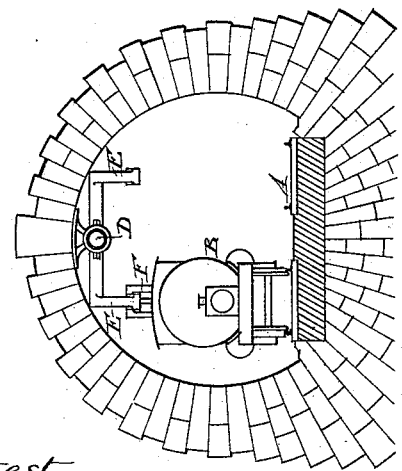
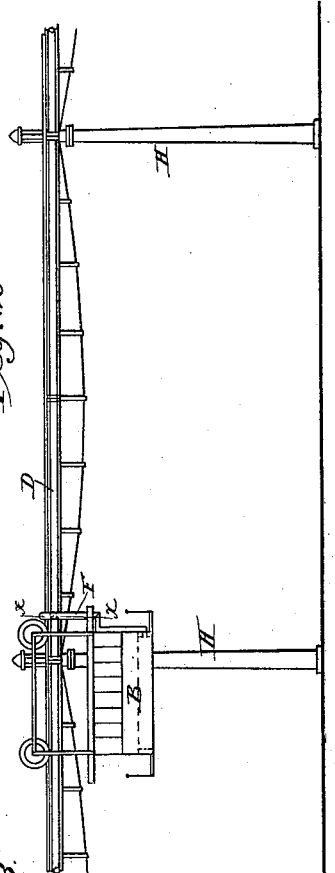
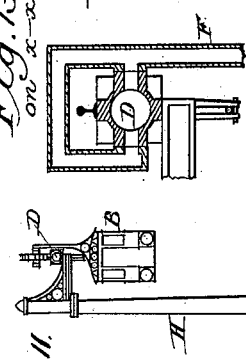
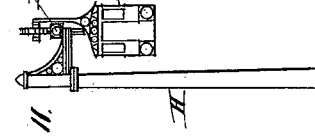
Attest:
Inventor
Hermann Wiedling
By his attorney
P. T. Dodge (No Model.) 9 Sheets—Sheet 4.
H. WIEDLING.
RAILWAY SYSTEM.
No. 338,681. Patented Mar. 23, 1886.
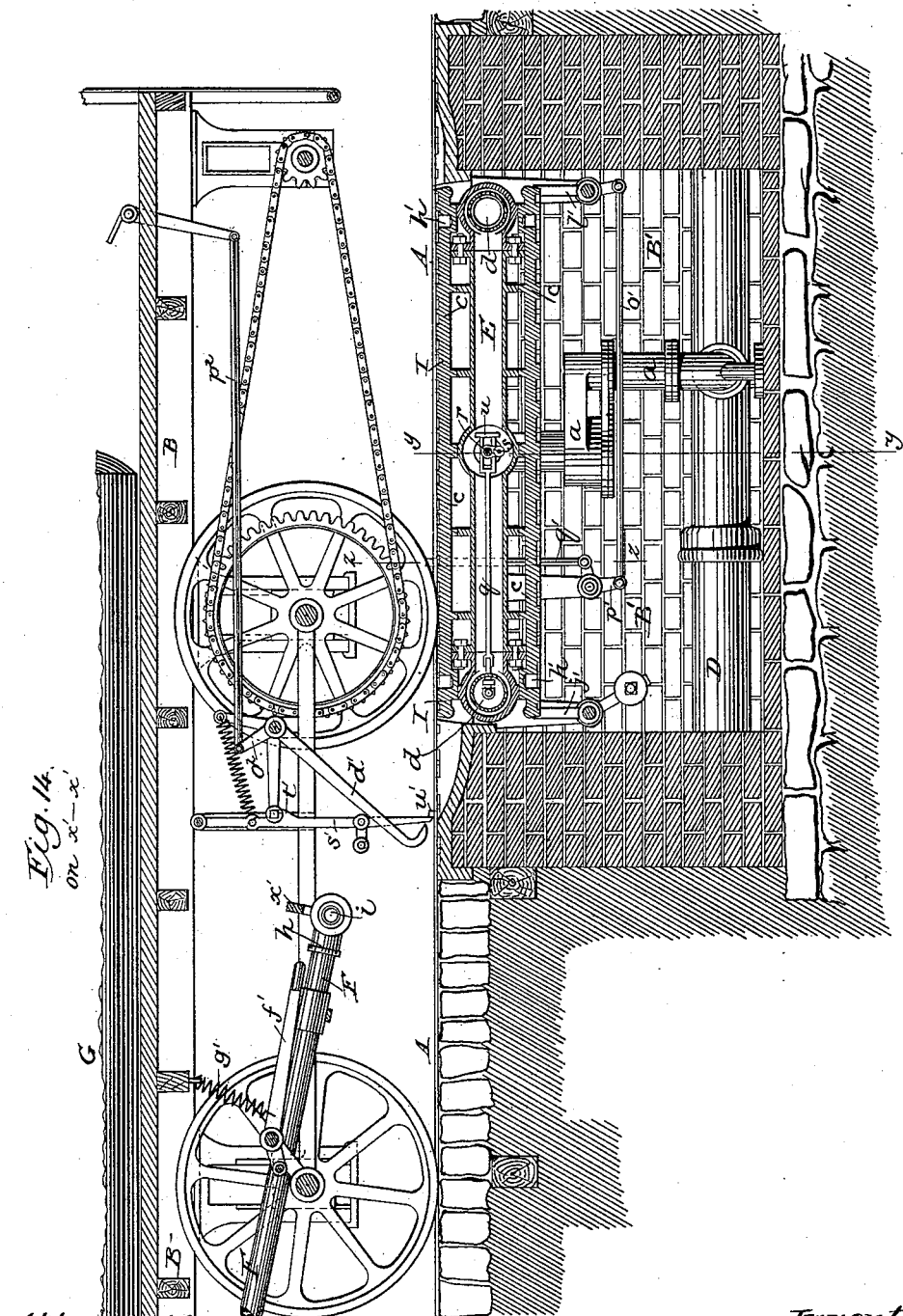
Attest:
S. R. Hollingsworth
W. H. Shipley
Inventor.
Hermann Wiedling
By his Attorney
P. T. Dodge (No Model.) 9 Sheets—Sheet 5.
H. WIEDLING.
RAILWAY SYSTEM.
No. 338,681. Patented Mar. 23, 1886.
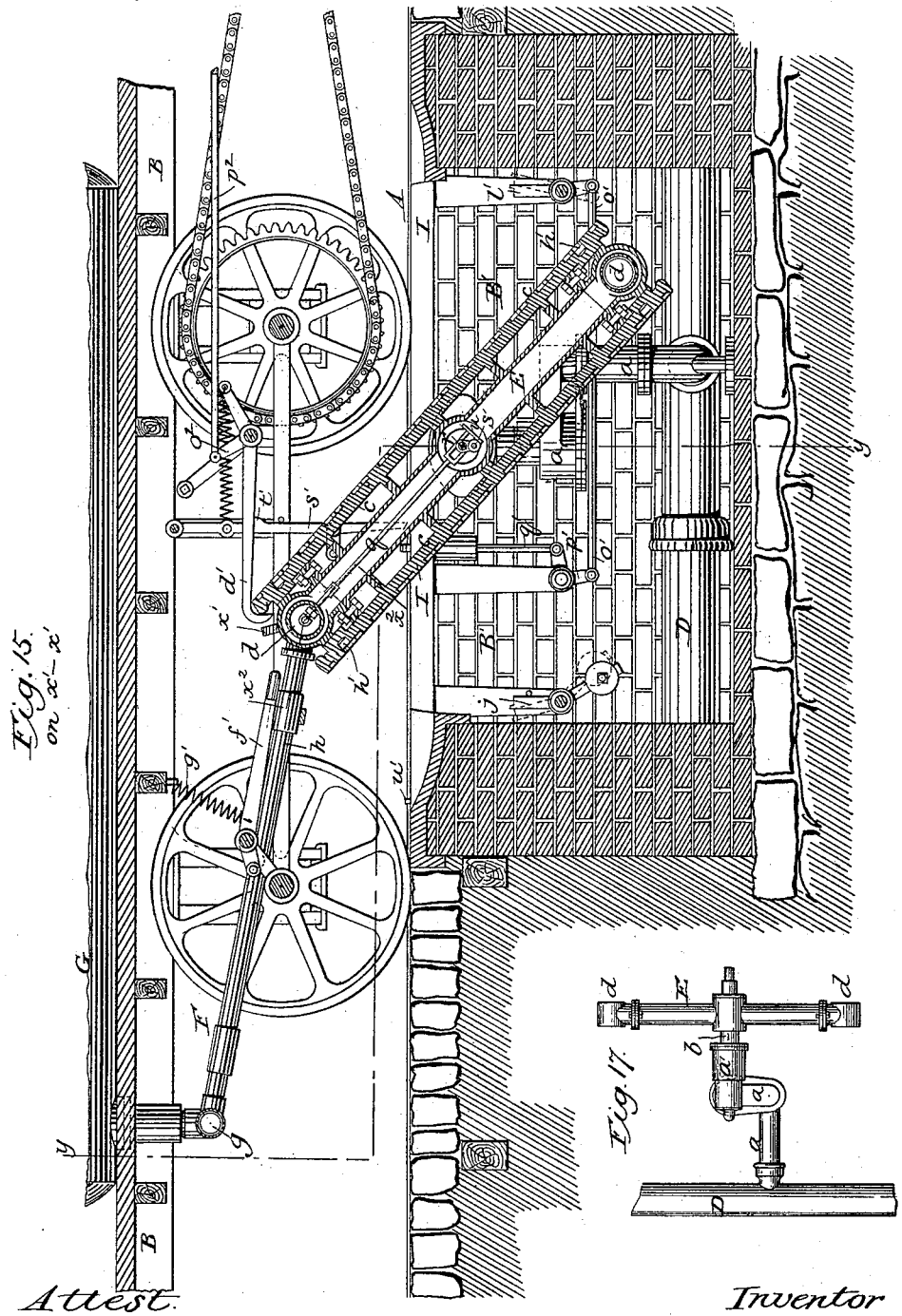
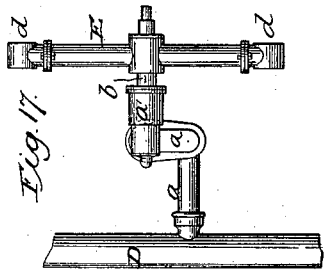
Attest:
J. R. Hollingsworth
N. H. Stewart
Inventor
J. H. Wiedling
By P. T. Dodge
Atty
N. PETERS, Photo-Lithographer, Washington, D. C.

(No Model.) 9 Sheets—Sheet 6.
H. WIEDLING.
RAILWAY SYSTEM.
No. 338,681. Patented Mar. 23, 1886.
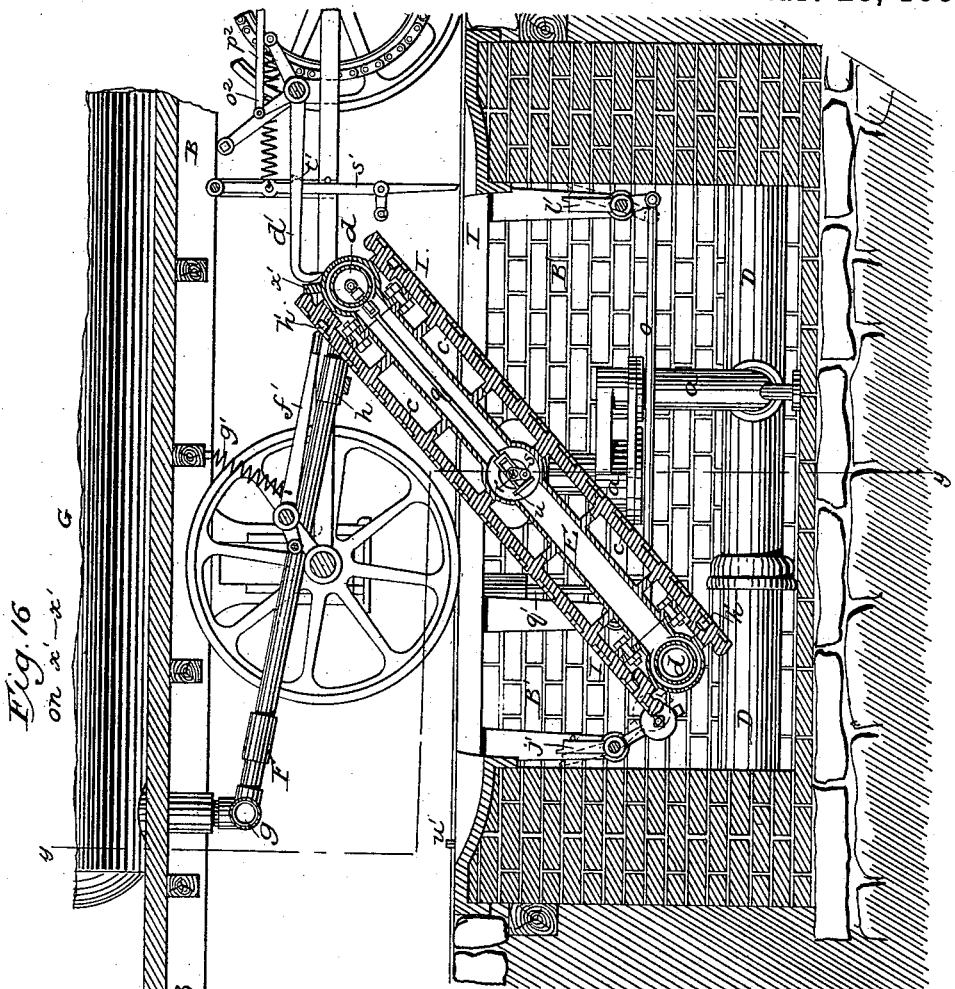
Fig. 16 on x—x'
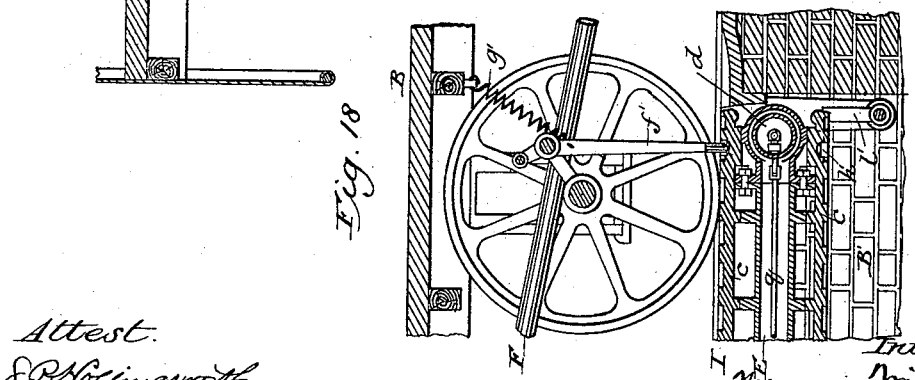
Fig. 18
Attest:
J. R. Hollingsworth
W. H. Shipley
Inventor
Hermann Wiedling
By his Attorney
P. T. Dodge (No Model.) 9 Sheets—Sheet 7.
H. WIEDLING.
RAILWAY SYSTEM.
No. 338,681. Patented Mar. 23, 1886.
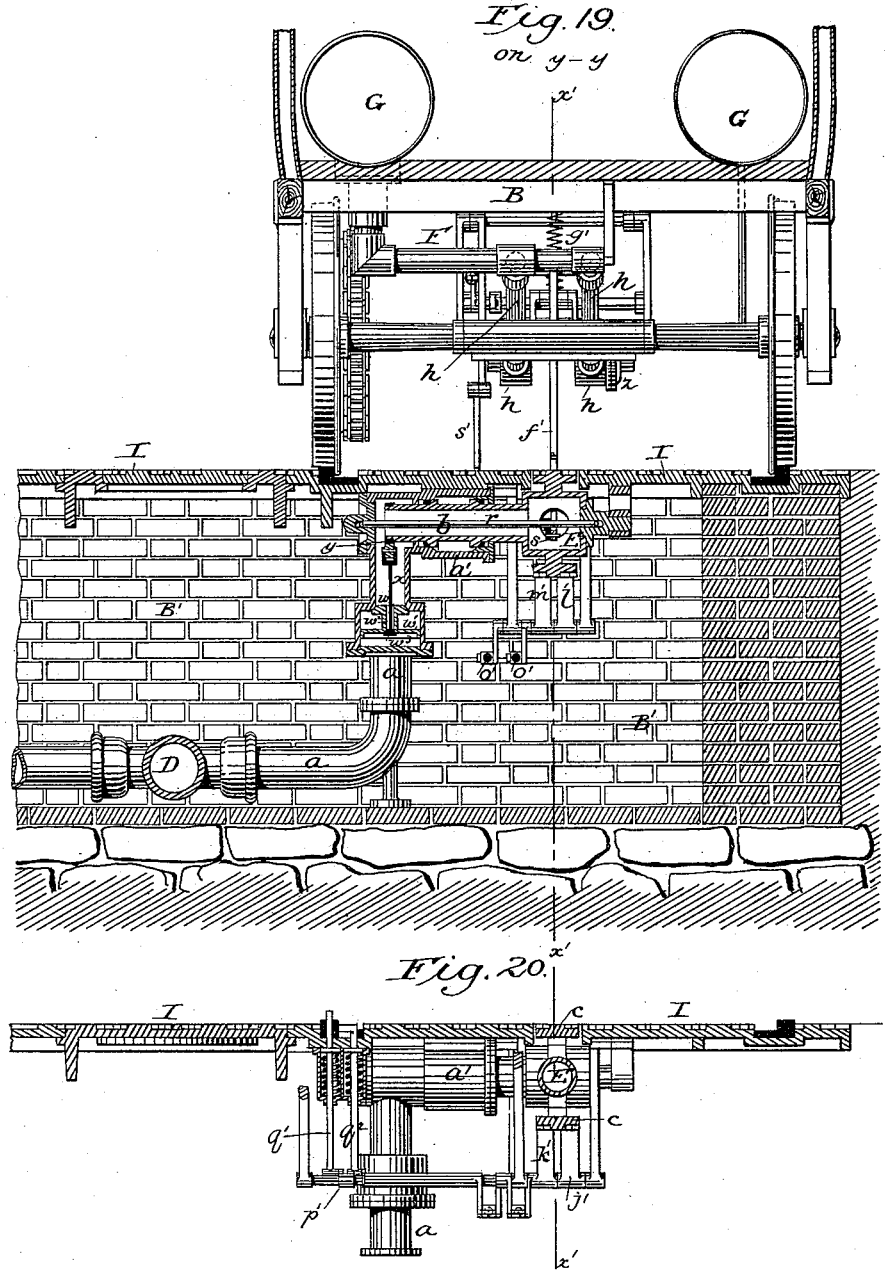
WITNESSES:
INVENTOR
BY P. T. Dodge,
ATTORNEY (No Model.)  9 Sheets—Sheet 8.
H. WIEDLING.
RAILWAY SYSTEM.
No. 338,681.  Patented Mar. 23, 1886.
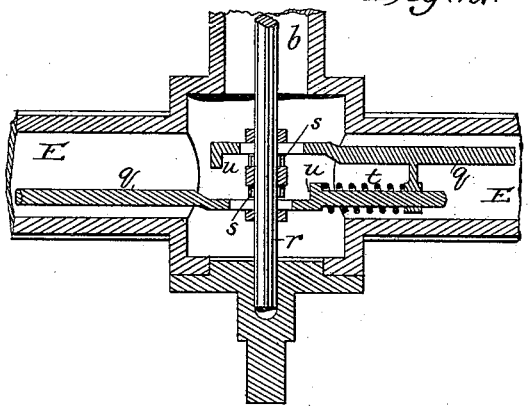
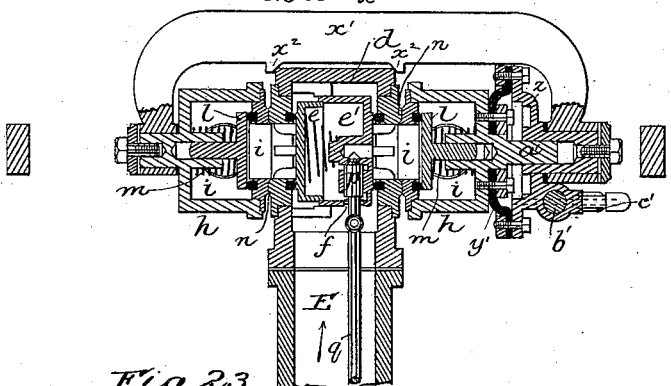
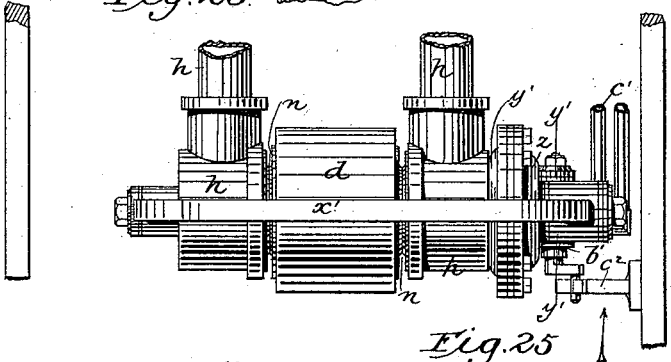
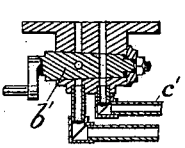
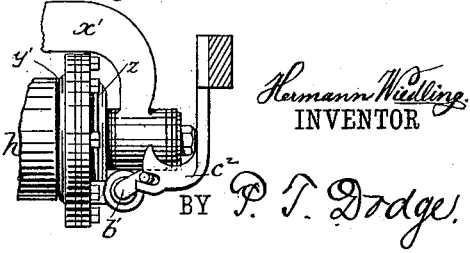
WITNESSES:
J. A. Hollingsworth
L. H. Shipley
Hermann Wiedling
INVENTOR
BY P. T. Dodge
ATTORNEY (No Model.) 9 Sheets—Sheet 9.
H. WIEDLING.
RAILWAY SYSTEM.
No. 338,681. Patented Mar. 23, 1886.
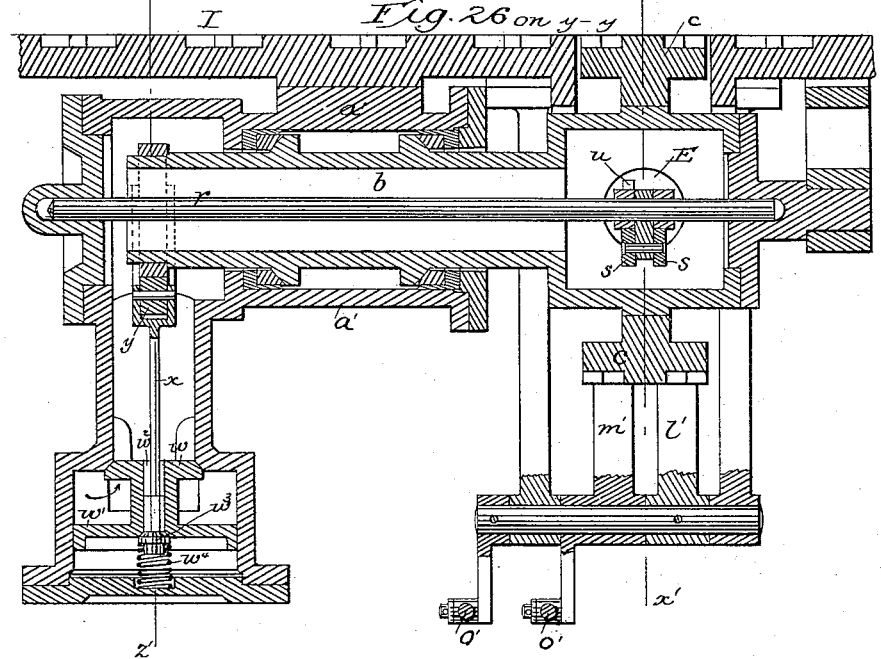
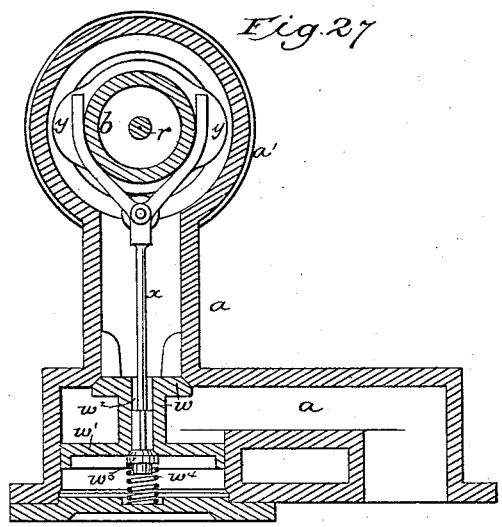
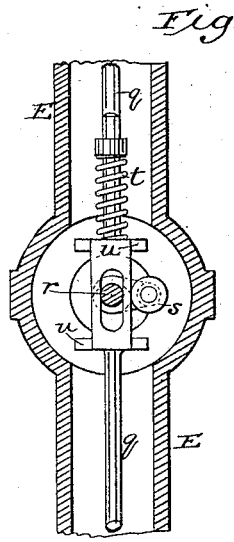
WITNESSES:
J. R. Hollingsworth
W. H. Shipley
Hermann Wiedling
INVENTOR
BY P. T. Dodge
ATTORNEY

UNITED STATES PATENT OFFICE.

HERMANN WIEDLING, OF BALTIMORE, MARYLAND, ASSIGNOR OF TWENTY-FOUR ONE-HUNDREDTHS TO THE WIEDLING MOTOR COMPANY, OF NEW YORK, N. Y.

RAILWAY SYSTEM.

SPECIFICATION forming part of Letters Patent No. 338,681, dated March 23, 1886.

Application filed October 23, 1884. Serial No. 146,340. (No model.)

*To all whom it may concern:*

Be it known that I, HERMANN WIEDLING, of Baltimore, in the State of Maryland, have invented certain new and useful Improvements in Railway Systems and Appliances, of which the following is a specification.

This invention has reference to those railway systems in which cars or locomotives carrying their own propelling mechanism are operated by compressed air, steam, or gas carried in receivers thereon, the receivers being recharged at suitable intervals from pumping or generating stations.

The particular aims of the invention are to avoid the necessity for the numerous pumping or generating stations and the expensive apparatus connected therewith, to provide for automatic and speedy connection of the receivers with the sources of supply at different points in the length of the road, and to admit of the connection being established without the necessity of stopping the car.

In carrying my invention into practice I provide one or more pumping or generating stations located at the ends or at an intermediate point in the length of the road, and to extend from this station or stations, lengthwise of the road, a pipe or conductor for the transmission of the operating-fluid. I connect with this conductor at suitable intervals automatic pipes and valves, whereby the fluid may be delivered from the conductor to the receivers of the cars. The coupling-pipe may be arranged to swing or slide or be combined with a swinging or sliding coupling on the car in such manner that the connection may be established and maintained while the car is in motion.

Under my system I am enabled to recharge the receivers at frequent intervals, while employing for the purpose but a single generating or pumping station, or a number of such stations less than the number of charging-stations.

For convenience of reference I will hereinafter designate the stations at which the compressing-pumps, boilers, gas-generators, or other sources of fluid-supply are located as the "generating-stations," and the secondary stations, at which the receivers of the cars are charged, as the "charging-stations."

As will hereinafter appear, the automatic devices for connecting the main conductor with the cars may be variously constructed; but I prefer to make use of a revolving pipe having a swiveled connection with the main and adapted to revolve while in connection with the receiving-pipe on the car.

Figure 6:
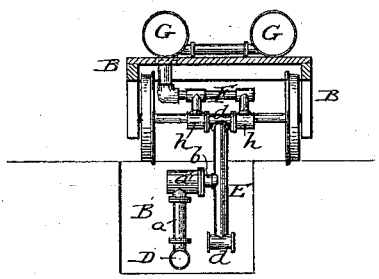
Figure 7:
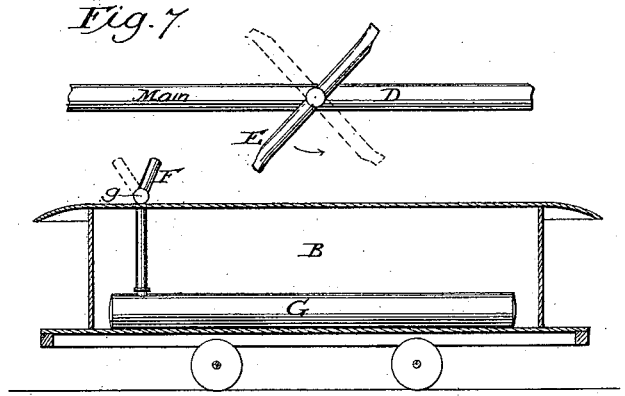
Figure 8:
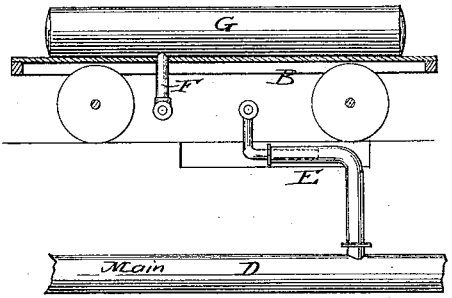

Referring to the accompanying drawings, Figures 1 and 2 are respectively a side elevation and a plan view of a double-track road provided with terminal charging-stations connected by a single main or pipe with a number of intermediate charging-stations, each of the latter provided with automatic coupling devices. Figs. 3 and 4 are like devices of a double-track road on which the main or conducting pipe is dispensed with and the generating-stations located adjacent to each of the automatic couplings. Figs. 5 and 6 are respectively side and end elevations showing a rotary coupling to connect with a swinging pipe on the car, this being the preferred form of automatic coupling. Fig. 7 is a side elevation of a similar arrangement, with the main located overhead instead of beneath the track. Fig. 8 is a side elevation of a coupling of a telescopic character. Figs. 9 and 10 are respectively a cross-section and a longitudinal section of a tunnel-railway having overhead conductors and stationary automatic coupling. Figs. 11 and 12 are respectively an end and a side elevation of a line on which the cars are suspended from an overhead conductor, and provided with coupling to effect a sliding connection therewith. Fig. 13 is a cross-section on the line *x x* of Fig. 12. Figs. 14, 15, and 16 are longitudinal vertical sections, on a larger scale, of the coupling system shown in Figs. 5 and 6, the respective views showing the position of the parts immediately before, during, and just previous to the conclusion of the charging operation. These sections are taken on the line *x′ x′* of Figs. 19 and 20. Fig. 17 is a top plan view of the rotary coupling-pipe and its connections with the main. Fig. 18 is a longitudinal vertical section showing the action of the devices on the car for restoring the rotary coupling-pipe to its normal position as the car passes therefrom. Fig. 19 is a vertical central cross-section on the line $y\ y$ of Figs. 14, 15, with the parts in the position which they occupy at the instant that the car leaves the coupling devices. Fig. 20 is a cross-section on the line $z\ z$ of Fig. 14, showing the devices by which the rotary coupling-pipe is locked in position. Fig. 21 is a longitudinal central section through the middle portion of the rotary coupling-pipe, showing the devices through which the discharge-valves are automatically operated by the rotation of the coupling. Fig. 22 is a section on the line $x^2\ x^2$ of Fig. 15, showing one end of a rotary coupling-pipe in connection with the receiving-pipe of the car. Fig. 23 is a top plan view of the same parts. Fig. 24 is a section on the line $y'\ y'$ of the preceding figure, showing the valve by means of which pressure is applied to maintain a tight joint between the coupling-pipe and the receiving-pipe. Fig. 25 is an elevation looking in the direction indicated by the arrow in Fig. 23, showing the devices for automatically operating the valves shown in the preceding figure. Fig. 26 is a vertical cross-section through the coupling-pipe and its adjuncts on the line $y\ y$ of Fig. 14, showing the connection of the rotary coupling-pipe with the main, and also the automatic valves by which the discharge is controlled. Fig. 27 is a cross-section on the line $z'\ z'$ of the preceding figure. Fig. 28 is a vertical section on the line $x'\ x'$ of Figs. 19, 20, and 26, showing the devices for operating the delivery-valve.

Referring to Figs. 1 and 2, A A' represent two parallel lines of surface-railway, provided with any suitable number of cars, B, each of which will be provided with a steam-engine, gas-engine, air-engine, or other motor. These cars and their motive apparatus may be of either of the many forms at present known in the art, my invention having no special reference thereto, except as regards the construction of their coupling devices, hereinafter described. Each car will be provided, as usual, with a receiver or reservoir to contain a supply of gas, compressed air, or highly-heated water sufficient to actuate the motive apparatus during the passage of the car from one charging-station to another. At the two ends of the road are located generating-stations C, each of which contains steam-boilers, air-compressing pumps, gas generating and pumping apparatus, or other appropriate means for supplying the particular motive fluid which may be demanded. From one of the generating-stations to the other is extended a pipe, main, or conductor, D, provided at suitable intervals in its length with automatic coupling mechanism E. By means of the conductor the fluid is delivered from the generating station or stations to the coupling devices, and by the latter delivered to the receivers of the cars at suitable intervals in the course of their journey, as will be hereinafter described in detail. The conductor should be provided at suitable points in its length with stop-valves F', by means of which communication with either of the generating-stations may be closed in the event of its apparatus becoming inoperative, or of other circumstances arising under which the maintenance of the connection becomes undesirable.

It will be observed that under the system outlined above the actuating-fluid may be supplied to cars at different points on the line from a single generating-station, thus avoiding the great expense attendant upon the use of a separate generating-station and its special plant at each point where the cars are to be charged.

Referring now to Figs. 3 and 4, A represents the surface-line of railway; B, the cars, such as mentioned in the preceding example; and C, the charging-stations. In this plan, however, the conducting pipe or main is omitted and a generating-station located at each point at which the cars are to be charged, each station being provided with automatic coupling devices E, as in the first instance, to connect with the cars.

In carrying my invention into effect the automatic coupling devices may be constructed in various forms, a few of which I will now describe in a general way, to the end that the scope of the invention may be more clearly understood.

Referring to Figs. 5 and 6, the main D is provided with an upright branch pipe, $a$, the upper end of which is extended horizontally and adapted to serve as a journal or support for the rotary coupling-pipe E, the two ends of which are brought alternately into connection with the receiving-pipes jointed to the respective cars and connected with their receivers G. As each car approaches the coupling its pipe F effects an automatic coupling with the pipe E, and by means of automatic valves the fluid is permitted to pass from the main through the coupling-pipe and receiving-pipe into the receiver. As the car advances the pipe E makes a half-revolution.

In Fig. 7 the main or conductor D is located overhead and provided with a double-ended rotary coupling-pipe, somewhat similar to that represented in the preceding figures, the pipe being arranged to make and break connection automatically with the swinging receiving-pipe F, jointed to the car. The construction is such that as the car advances the upper end of this pipe F is thrown into the end of the pipe E. As the car advances the two pipes swing upon their journals, finally assuming the position indicated in dotted lines, so that they disconnect automatically.

In Fig. 8 the main is provided with a coupling-pipe, E, arranged to slide telescopically in a branch thereof. The car is provided with a fixed receiving-pipe, F, which engages automatically with the pipe E, carrying the latter forward for a limited distance as the car advances, and finally disengaging automatically.

Referring to Figs. 9 and 10, the main or conductor is fixed in the top of the tunnel through which the cars pass. It is provided with rigid dependent coupling-pipes E, and the car provided with receiving-pipes F, which connect automatically therewith when the car is brought into proper position thereunder.

Referring to Figs. 11, 12, and 13, the cars are suspended by overhead wheels from a track or rail mounted on top of the conductor pipe or main D, which is in turn supported by brackets on the upper ends of pillars H. The receiver of the car is provided with a fixed receiving-pipe, F, the upper end of which is shaped as shown in Fig. 13, to clasp or embrace the two sides of the conductor, and provided with ports or openings, which may be caused to register with corresponding openings in the sides of the conductor, so that when the car is arrested in the proper position the fluid may pass from the main into the receiver.

In each of the systems above outlined automatic valves will be provided to open and close the pipes, to maintain a close connection between the parts, and to insure their connection and disconnection. The devices used for this purpose in connection with the plan represented in Figs. 5 and 6 will be hereinafter described in detail.

The details pertaining to the plan represented in the other figures will be made the subject of separate applications for patent.

Referring to the preferred form of apparatus represented in Figs. 14 to 25, A represents the railway-track; D, the supply-pipe or conductor extending lengthwise of the road, and connecting at one or both ends with the main stations containing steam-boilers, gas-generators, or other appropriate means for supplying the particular fluid which may have been selected for the propulsion of the cars, as before mentioned. The main conductor is preferably embedded in the earth, as shown in the drawings.

B' represents a pit or chamber located beneath the track to receive the devices for supplying the fluid to the cars passing thereover. It is to be noted that there may be any suitable number of these pits located at the points at which it may be required to charge the cars. In each of these pits the main or conductor is provided with a branch pipe, $a$, rising therefrom, and terminating in a branch portion, $a'$, Figs. 17 and 19, which extends transversely beneath the track, this horizontal portion being intended as a journal for the rotary coupling-pipe, about to be described.

E represents the coupling-pipe, of a T form, as represented in Fig. 17, its lateral branch $b$ being mounted, as shown in the several figures, to revolve loosely on the stationary branch pipe $a'$, whereby the main portion of the coupling-pipe is permitted to revolve or turn end for end in a vertical plane extending lengthwise of the road. The top of the pit or chamber is covered by a stationary plate, I, which is, however, provided with a longitudinal slot to admit of the ends of the coupling-pipe rising through the same as it is turned end for end. The opposite sides of the coupling-pipe are provided, as shown, with plates $c$, bolted firmly thereto, these plates being of such size and arrangement that when the coupling-pipe is in a horizontal position one or the other of the plates will close the slot or opening in the stationary plate I, as shown in the drawings. At each end the coupling-pipe E terminates in a head, $d$, provided at its two sides with outlet openings or throats closed, respectively, by valves $e$ and $e'$. These valves are made circular and hollow, so as to fit one within the other, as plainly represented in Fig. 22, and are urged apart so as to close the throats by means of an internal spiral spring. Their closing action is further secured by the internal pressure of the gas or fluid, which enters within them through an opening, $f$, provided for the purpose, as in Fig. 22. It will be perceived that when the valves $e$ and $e'$ are open the fluid can flow from the main through the branch pipe $a$, and thence through the coupling-pipe E, and finally past the valves, but that when the valves are closed the escape of the fluid is prevented.

For the purpose of conducting the fluid from the coupling-pipe E to the cars or locomotives, each of the latter is provided, as shown, at the under side, with a receiving-pipe, F, connected at the rear end by a swivel-joint, $g$, to the receiver or reservoir G of the car. At the forward end this receiving-pipe is forked or divided into two branches, $h$, adapted to embrace or straddle the ends of the coupling-pipe E, in the manner represented in Figs. 15, 22, and 23. These arms of the receiving-pipe are provided on their inner faces with valve ports or throats $i$, which register with the outlet-throats of the coupling-pipe when its head is introduced between the arms of the receiving-pipe, as shown in Fig. 22. These inlet-ports $i$ of the receiving-arm are each closed by a valve, $l$, acted upon by a spiral spring, $m$. When the valves $e$ and $e'$ of the coupling-pipe are open, the fluid escaping thereby will lift the valves $l$ of the receiving-pipe and pass thereby into the receiver of the car, and when the delivery of the fluid ceases the valves $l$ will close and retain the fluid under pressure in the receiver.

On reference to Fig. 22 it will be observed that the arms of the receiving-pipe are adapted to fit closely against the head of the coupling-pipe, and that they are provided with annular lips $n$, surrounding the valve-ports $i$, and adapted to fit within the corresponding depressions in the head of the coupling-pipe, this construction assisting to maintain a close joint between the parts and to maintain them in their proper relative positions.

Owing to the fact that the coupling-pipe E is adapted to revolve end for end, and that the receiving-pipe F is jointed at its rear end, it follows that a connection between the two may be established and maintained while the car is in motion, the end of the coupling-pipe to which the receiving-pipe is attached being carried forward by the advance of the car in the manner illustrated in Figs. 5 and 6, and hereinafter described in detail. The coupling-pipe being turned from a horizontal position, the receiving-pipe engages with one end thereof, and during the advance of the car the coupling-pipe makes a half-revolution, so that its opposite end is presented to receive the coupling-pipe of the next car. In this manner, it will be perceived, the two ends of the coupling-pipe are brought alternately in position for connection with the cars.

In order to secure the automatic action of the apparatus, I provide means whereby the rotation of the coupling-pipe E is caused to effect the automatic opening and closing of its valves $e$ and $e'$ at that end which is for the moment in use. The faces of the valves are projected beyond the seats or throats on which they bear, so that the fluid pressing thereon within the coupling-pipe tends to open the valves. Owing, however, to the fact that the interior surface of the valves is greater than the surface thus exposed beyond the seats, the pressure of the fluid holds the valves normally in a closed position. A secondary or relief valve, $p$, opens, as shown in Fig. 22, from the interior of the valves $e$ and $e'$ through the discharge-ports. When, therefore, this valve is opened, the internal pressure is relieved, whereupon the external pressure on that portion of the valves outside of the seats effects their opening, so that the fluid may pass into the receiving-pipe. The two secondary valves $p$, at opposite ends of the coupling-pipe, are jointed to operating-rods $q$, which extend inward to the middle of the coupling-pipe, where their ends are slotted and mounted to slide on a stationary shaft, $r$, carrying a crank, $s$, as shown in Figs. 14, 15, 16, 19, 21, 26, 28. A spiral spring, $t$, mounted on one of these rods, acts against an arm on the other, as shown in Fig. 28, so that it tends to hold both of the secondary valves in a closed position. Each of the valve-rods is formed with a shoulder, $u$, in such position that when the coupling-pipe is revolved the shoulders of the two rods will be brought alternately in contact with the crank $s$, which will have the effect of operating the rods one at a time, and of opening that secondary valve which is in the upper end of the coupling-pipe—that is to say, in that end of the coupling-pipe which is for the time being in connection with the receiving-pipe of the car. Thus it will be seen the rotation of the coupling-pipe is rendered instrumental in opening the discharge-valves $e$ and $e'$, which are automatically opened when the connection is established between the coupling-pipe and the receiving-pipe, and automatically closed when the connection is severed.

As a further means of holding the fluid in check, to the end that its escape may be prevented in the event of a leakage of the valves $e$ and $e'$, I provide the branch pipe $a$, which leads from the main, with a piston-valve, $w$, as shown in Figs. 26 and 27. The lower end of this valve has the piston $w'$, of greater diameter than its upper portion or valve proper, arranged to slide closely within a cylinder. An opening, $w^2$, extending through the valve from one side to the other, is closed at the lower end by a check-valve, $w^3$, urged upward by a spring, $w^4$. When this check-valve is closed, the main valve remains also closed, as represented in the above figures. A spindle, $x$, extends from the check-valve upward to the revolving branch or trunnion of the coupling-pipe E, and is forked to embrace the same. This forked end of the spindle is provided with a roller arranged to be acted upon by two cams, $y$, on the end of the coupling-pipe, as shown. When the coupling-pipe is turned during its connection with the car, one or the other of the cams $y$ will depress the spindle $x$ and open the check-valve $w^3$, whereupon the fluid-pressure will cause the main valve $w$ to open, so that the fluid may pass thence through the coupling-pipe. It is to be noted that this valve $w$ may be dispensed with, or that it may be used alone as a substitute for the valves $e$ $e'$.

From the foregoing it will be observed that the escape of fluid through the coupling-pipe is controlled by two independent automatic valve mechanisms, so that in the event of the failure of either the other will prevent the escape of fluid.

Referring again to the construction of the receiving-pipe F and its inlet-valves, attention is particularly directed to Figs. 14, 15, 16, 22, 23, 24, and 25. The two arms or branches $h$ of the inlet-pipe are connected by a cross-bar or yoke, $x'$, having at the middle inclined shoulders $x^2$, which ride against the head of the coupling-pipe, so as to assist in guiding the same between the branches of the receiving-pipe. One of the branches of the receiving-pipe, instead of being secured directly and rigidly to the bar $x'$, is connected therewith through the medium of a sliding spindle, $a'$, this construction permitting the two branches of the pipe to move slightly to and from each other, in order that the head of the coupling-pipe may be inserted between them, and that they may be closed together subsequently against its sides. The movable arm is attached to a diaphragm, $y'$, which is in turn attached at its periphery to the edge of a concave disk, $z$, secured to the cross-bar or yoke in such manner that if fluid under pressure be admitted into the space between the diaphragm and the disk it will have the effect of urging the adjacent arm of the receiving-pipe tightly against one side of the coupling-head, and on the other hand of forcing the arm $x'$ endwise, so that it will draw the other arm of the receiving-pipe against the opposite side of the coupling-head. In this way the two arms of the receiving-pipe will be held in intimate contact with the coupling-head, so as to prevent leakage.

For the purpose of effecting the admission and discharge of the fluid, as just mentioned, I connect with the receiving-space, behind the diaphragm, a two-way cock or valve, $b'$, such as shown in Figs. 24 and 25, one of the throats of which is connected by a pipe, $c'$, with the reservoir or receiver of the car. This cock is provided with an operating crank or handle, one end of which enters a notched arm, $c^2$, secured to the car-frame. As the forward end of the receiving-pipe F rises in swinging upward with the end of the coupling-pipe, the cock rises and falls therewith, and in so doing it is opened and closed by means of the stationary arm. The parts are so arranged that as soon as the arms of the receiving-pipe embrace the head of the coupling-pipe the cock $b'$ is opened, and the arms thereby caused to embrace the coupling-pipe firmly, this action taking place before the main valves are opened to permit the passage of the fluid from the main. In like manner the cock $b'$ is operated previous to the disconnection of the coupling-pipe, to discharge the fluid from behind the diaphragm, and thus permit the receiving-arms to separate from the head, this action occurring after the main valves are closed.

In order to insure the proper connection and disconnection of the pipes, I provide the car with a depending hook, $d'$, the office of which is to engage beneath a shoulder at the end of the coupling-pipe E, and thus swing the pipe upward as the car passes thereover, so that the receiving-pipe will be certain to connect therewith. The hook also serves to assist in imparting the rotary motion to the coupling-pipe as the car passes therefrom. In the action of the apparatus the receiving-pipe is disconnected from the coupling-pipe at or about the time the parts are in the position represented in Fig. 16, before the coupling-pipe has reached a horizontal position.

For the purpose of continuing the movement of the coupling-pipe and forcing it positively to a horizontal position, I pivot to the under side of the car-frame an arm or lever, $f'$, which is held normally in an elevated position by means of a spring, $g'$. This arm stands in such position that the instant the disconnection of the parts is to be effected it will enter the hole or shoulder $h'$, formed in the top of the coupling-pipe E, in the manner plainly represented in Fig. 16. Being thus engaged, the forward motion of the car causes the arm to tip downward to a vertical position, and thus complete the motion of the coupling-pipe, as shown in Fig. 18. As the car passes forward, the arm disengaging from the pipe is raised by the spring to its normal position.

It is necessary to provide means for locking the coupling-pipe E when not in action in its horizontal position. For this purpose I employ two gravitating locking devices at each end. At one end the locking devices $j'$ and $k'$ consist, simply, of upright shouldered arms mounted on a horizontal pivot and weighted at their lower ends. These arms, yielding as the end of the coupling-pipe swings upward past them, swing backward thereunder when it reaches its proper position. The two dogs $l'$ and $m'$ at the opposite end of the coupling-shaft are also mounted on horizontal pivots, and are connected each by a rod, $o'$, with an elbow-lever, $p'$, from which an upright rod, $q'$, extends upward through and above the car-track in a position to be depressed by the passing car. It will be observed that each of the dogs has a connection in this character independent of the other, and that the two operating-rods $q'$ and $q^2$ rise one through the flange and the other through the tread of the rail. The two dogs engage the pipe simultaneously, and it can only be released by their simultaneous disengagement. This disengagement will be effected by the car-wheels, the form of which is such that they will act upon and depress both rods at the same time. This result will not be accomplished by the passage of carriage or wagon wheels, the faces of which are of such character that they can depress but one rod at a time. It follows, consequently, that although the passing cars will unlock the coupling-pipe, it is not likely that they will be accidentally unlocked by the passage of other vehicles.

The essence of my invention in this regard consists in the employment of a lock, the mechanism of which requires to be disengaged by the automatic action of two distinct devices—one arranged to be actuated by the flange and the other by the tread of the wheel. The two dogs $l'$ and $m'$ are thrown into an active position by means of spiral springs applied to urge the rods $q'$ and $q^2$ upward, as represented in Fig. 20.

As the most convenient mode of construction, I propose to apply the locking-dog $l'$ to a solid shaft extending centrally through a tubular shaft, which carries the dog $n'$, as represented in the various figures; but any other suitable construction may be adopted.

In practice it is sometimes desirable to have the cars pass the relay or charging stations without connecting with the supply-pipe. To secure this action, I secure the shaft of the arm $d'$ with an arm, $o^3$, from which a rod, $p^2$, will extend to a position in which it may be operated by the attendant, or to a hand-lever or other equivalent device by which to effect its operation. By means of these devices the hooked lever may be raised so that it will pass over the coupling-pipe without engaging the same, in consequence of which the pipe will remain in its horizontal position, so that the car will pass thereover without establishing a connection.

To maintain the hooked arm $d'$ in its elevated or inactive position, I provide the car with a pivoted depending arm, $s'$, having a shoulder, $t'$, to engage beneath a pin or stud on the hooked arm, in the manner represented in Fig. 14. This sustaining-arm $s'$ is extended downward in such position as to encounter a stationary stud or projection, $u'$, provided for the purpose adjacent to the station. As the car advances the stud will trip the arm $s'$ backward, causing it to release the hooked arm, which will thereupon descend and engage the coupling-pipe, in the manner before explained.

While I have referred throughout this specification for convenience to the "cars" as provided with the "receivers" and "receiving-pipe," it is to be understood that the cars may be replaced by locomotives or engines designed to draw trains of cars.

I am aware that it has been proposed to establish a connection between a stationary supply pipe or main and a moving car by providing the car with a rotary pipe to enter a nozzle on a special charging-car, which was to move to and fro on a special track curving to one side of the main track, and connected in its turn by a flexible hose with the main, and to such arrangement I lay no claim. In my system the receiving-pipe of the car connects directly with the receiving-branch of the main, so that no charging-cars or flexible pipes are required.

I believe myself to be the first to establish an automatic connection directly between the car and a delivery branch or pipe from the main, the first to apply the pressure of the air or other fluid to produce and maintain a close contact between the coupling-surfaces of the car and the main, and the first to arrange the receiving-pipe of the car and the supply-pipe of the main with coupling-surfaces extending in the line of progression, so that they may slide upon each other during the coupling and uncoupling action.

Having thus described my invention, what I claim is—

1. In combination with the stationary main and the movable car, the delivery-pipe jointed to the main and the receiving-pipe jointed to the car, said pipes having side throats or openings and coupling-faces in a plane parallel with the line of travel, whereby the coupling-surfaces are adapted to slide upon each other during the coupling and uncoupling action.

2. In combination with the stationary main, the movable car, their movable pipes provided with coupling-faces which are held in contact by fluid-pressure, and means, substantially as described and shown, for applying the fluid-pressure to hold said coupling-faces in contact.

3. In combination with a car having a receiving-pipe to connect therewith, the double-ended rotary coupling-pipe.

4. In combination with the rotary coupling-pipe, the car provided with a receiving-pipe, and with an arm to engage and turn the coupling-pipe, whereby an automatic coupling of the two pipes is insured.

5. The main provided with a rotary coupling-pipe, in combination with the car provided with the receiver and swinging receiving-pipe, whereby a connection between the main and the receiver may be established and maintained while the car is in motion.

6. The main and its rotary coupling-pipe, in combination with a valve to close said pipe, and mechanism, substantially such as shown, operated by the rotation of the pipe to actuate said valve, whereby the rotation of the pipe is caused to effect the automatic opening of the valve.

7. In combination with a railroad-car provided with a receiving-pipe, the main and the rotary coupling-pipe provided with an eccentric, $g$, the valve $w$, to control the discharge from the main, and the rod or spindle connecting the same with the eccentric.

8. The combination, substantially as shown, of a car provided with a receiving-pipe and the main, the rotary coupling-pipe C, provided with the outlet-ports, the valves $e\ e'$, the secondary valve $f$, its spindle, and the stationary crank to actuate the spindle, whereby the rotation of the coupling is caused to apply the fluid-pressure to the opening and closing of the discharge-valves.

9. In combination with a car provided with a receiving-pipe and the coupling-pipe provided with the two outlet-ports on opposite sides, the hollow valves $e\ e'$, exposed beyond their seats, and the valve $f$, to control the fluid-pressure within said hollow valves, whereby the pressure is caused to open and close the valves as may be demanded.

10. In combination with the rotary coupling-pipe, the car provided with the receiving-pipe, and the mechanism for lifting said arm at will above an operative position, whereby a connection with the coupling-pipe may be automatically secured or avoided at the will of the attendant.

11. In combination with the rotary coupling-pipe, the car provided with the receiving-pipe, the arm to engage and turn the coupling-pipe, and the detent to sustain said arm mechanically in an inoperative position.

12. The rotary coupling-pipe, in combination with the car provided with the receiving-pipe, the arm $d'$, to turn the coupling-pipe, the detent to sustain said arm, and the fixed device to trip the detent, whereby the arm after being carried past one coupling-pipe is caused to automatically engage the next.

13. The main provided with the rotary coupling-pipe, in combination with the car provided with the receiving-pipe, the arm $d'$, to bring the coupling-pipe into action, and the second arm, $f'$, to restore the coupling-pipe to its normal position.

14. The rotary coupling-pipe, in combination with the car provided with the receiving-pipe and the arm $f'$.

15. In combination with the rotary coupling-pipe, two independent locking mechanisms provided with operating devices extending above the track at different points, whereby the release of the pipe by the accidental operation of either locking device is avoided.

16. In combination with the movable coupling-pipe and locking mechanism therefor, two operating-rods for said mechanism extended above the track in position to be operated by the tread and the flange of the car-wheels, respectively.

17. In combination with the car and the swinging receiving-pipe thereon, the rotary coupling-pipe connected with the main or source of fluid-supply, and the covering-plate D, provided with the channels or recesses opposite the end or ends of the pipe.

18. In combination with the rotary coupling-pipe located beneath the track in a pit or chamber, the covering-plate slotted to permit the rotation of the pipe, and the side plates applied to the pipe to close the slot in the covering-plate, as shown.

19. In combination with a railway-car having the coupling-pipe to connect therewith, the receiving-pipe divided or branched to embrace the coupling-pipe, the diaphragm or its equivalent, and a conductor for admitting fluid behind the diaphragm, whereby the receiving-pipe is caused to maintain a close connection with the coupling-pipe, as described.

20. The car having the coupling-pipe provided at its end with a head having outlet-openings in opposite sides, in combination with the divided receiving-pipe having mouths to register with said outlet-openings, and the bar $x$, connecting the two arms of the receiving-pipe, whereby it is adapted to assist in effecting the connection of the pipes, as described.

21. In combination with the car having the movable divided receiving-pipe, the connecting-bar $x$, having a sliding connection at one end, the fluid-pressure device to urge the two arms of the pipe toward each other, its controlling-valve $b'$, and the arm $c'$, to actuate said valve, whereby the arms are caused to automatically clamp and release the coupling-pipe.

22. In combination with the railway-car provided with a receiving-pipe, the rotary coupling-pipe, the valves at its two ends, their secondary valves $f$, the two valve-spindles $q$, the stationary crank, and the spring applied to actuate the two spindles.

HERMANN WIEDLING.

Witnesses:
ARTIS H. EHRMAN,
AUGUST STAHL.